Feb. 9, 1971 W. H. SCHOTTEL 3,562,068
EDGE VENEER APPLICATOR
Filed March 26, 1968 3 Sheets-Sheet 1
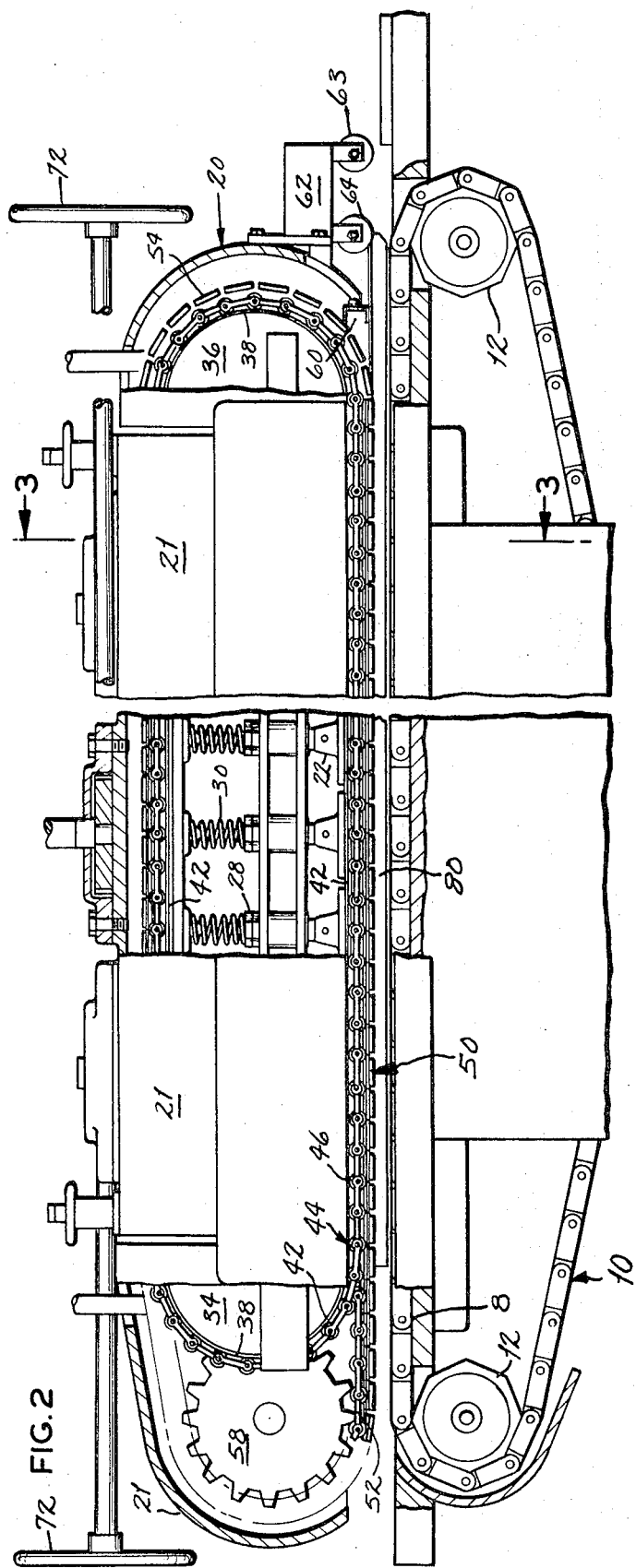
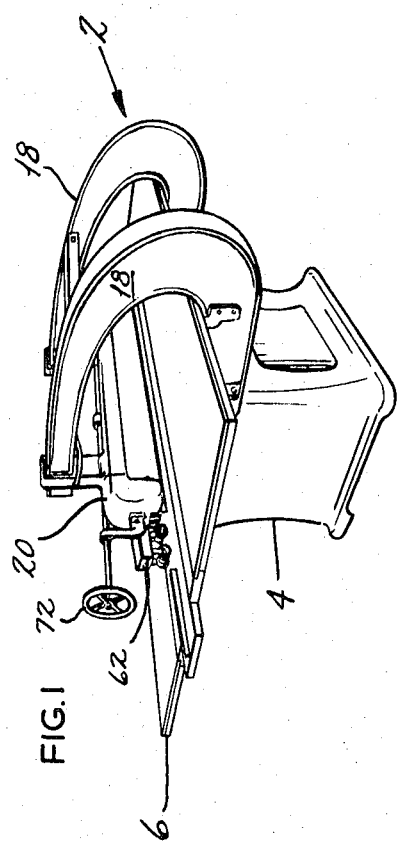
INVENTOR
WILLIAM H. SCHOTTEL
BY
ATTORNEY Feb. 9, 1971 W. H. SCHOTTEL 3,562,068
EDGE VENEER APPLICATOR Filed March 26, 1968 3 Sheets-Sheet 2

INVENTOR
WILLIAM H. SCHOTTEL
BY
ATTORNEY

Feb. 9, 1971 W. H. SCHOTTEL 3,562,068
EDGE VENEER APPLICATOR

Filed March 26, 1968 3 Sheets-Sheet 3

INVENTOR
WILLIAM H. SCHOTTEL
BY John D. Pope III
ATTORNEY

United States Patent Office 3,562,068
Patented Feb. 9, 1971

3,562,068
EDGE VENEER APPLICATOR
William H. Schottel, Belleville, Ill.
(2121 Walton Road, St. Louis, Mo. 63114)
Filed Mar. 26, 1968, Ser. No. 716,221
Int. Cl. B32b 31/10, 31/20
U.S. Cl. 156—544
9 Claims

ABSTRACT OF THE DISCLOSURE

A T-shaped heater strip fitted against the upper heater bar of a veneer splicing machine having pressure chains on each side of the heater bar and feed chains located below the pressure chains and exposed through the work surface of the machine table. Toed-in rollers urge a pair of panels towards the depending leg of the heater strip as the panels are drawn through the machine by the chains. A veneer band is interposed between the edge of each panel and heater strip and these are securely bonded to the panels by heat and pressure.

---

This invention relates in general to a veneer applicator and, more particularly, to a machine for applying veneer bands to the edges of wood and other panels.

Machines have been developed for splicing or edgewise joining veneers to one another in a continuous operation without the necessity of clamps and other stationary holding devices. Such machines accept two separate sheets of veneer at their infeed ends, apply adhesive to the edges selected for joining, and through the subsequent application of pressure and heat securely join the edges one to the other in a tight bond so that a single sheet of veneer emerges from the discharge end of the machine.

According to the present invention the longitudinally extending flat heater strip in such a veneer splicing machine, which strip heats as well as maintains pressure on the upwardly presented surfaces of the two juxtaposed sheets of veneer, is replaced with a heater strip having a T-shaped cross-sectional configuration. The downwardly extending leg or member of the T-shaped heater strip serves as a heated abutment for veneer forming the edge band on a panel, thereby thoroughly curing the adhesive and forming a tight bond with the edge of the panel. By making the machine thus convertible, the veneer splicing machine can be used for edge-banding operations as well as splicing operations.

Among the several objects of the present invention are the provision of a machine which applies veneers to the edges of panels in a continuous operation without resort to clamps and other stationary holding devices; the provision of a machine of the type stated which is easy to operate and efficient in operation; and the provision of a heater strip which converts a conventional veneer splicing machine to an edge-banding machine. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a perspective view of a veneer applicator constructed in accordance with and embodying the present invention;

FIG. 2 is a fragmentary side elevational view, partially broken away and in section, of the veneer applicator;

Corresponding reference characters indicate corresponding parts throughout the several views of the drawings.

Figure 3:
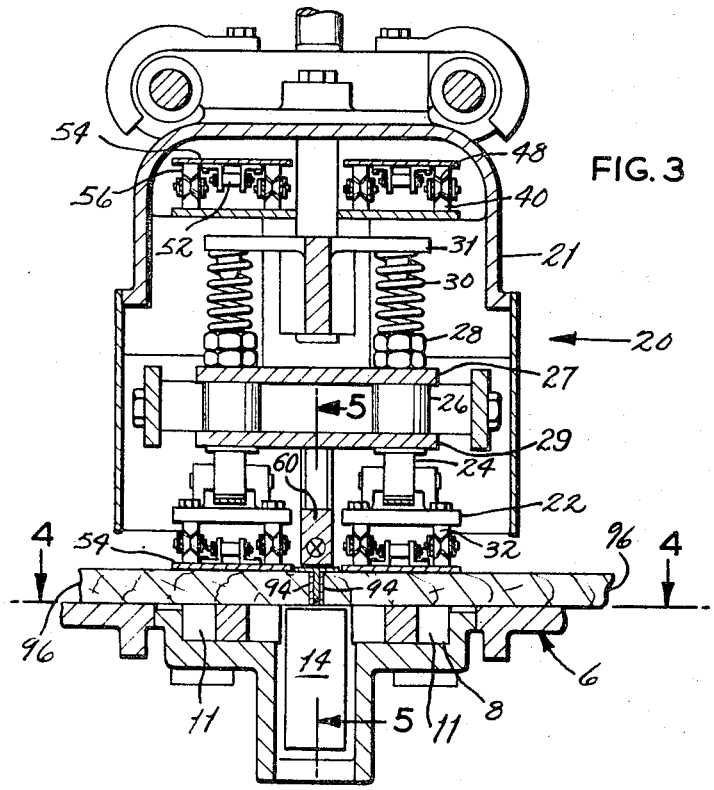
FIG. 3 is a sectional view taken along line 3—3 of FIG. 2.
Figure 4:
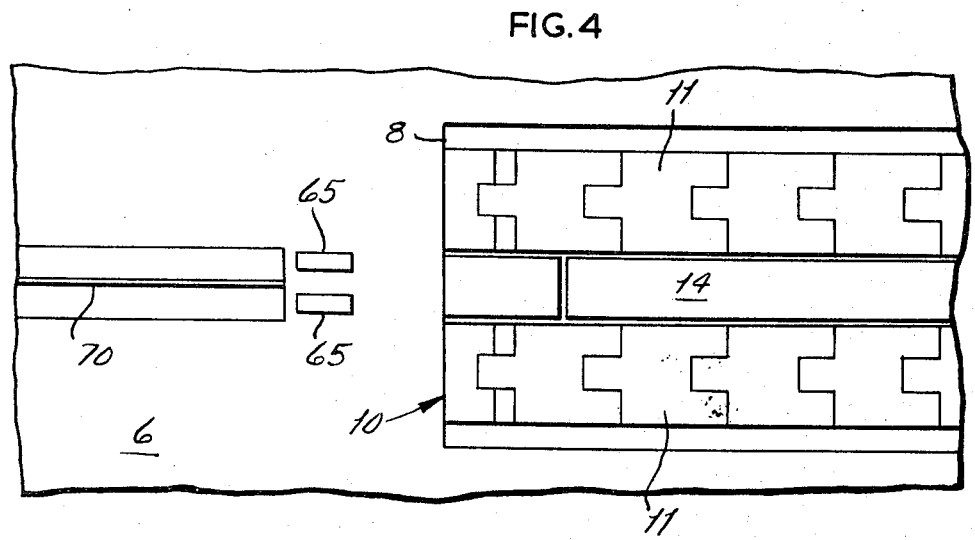
FIG. 4 is a sectional view taken along line 4—4 of FIG. 3.
Figure 5:
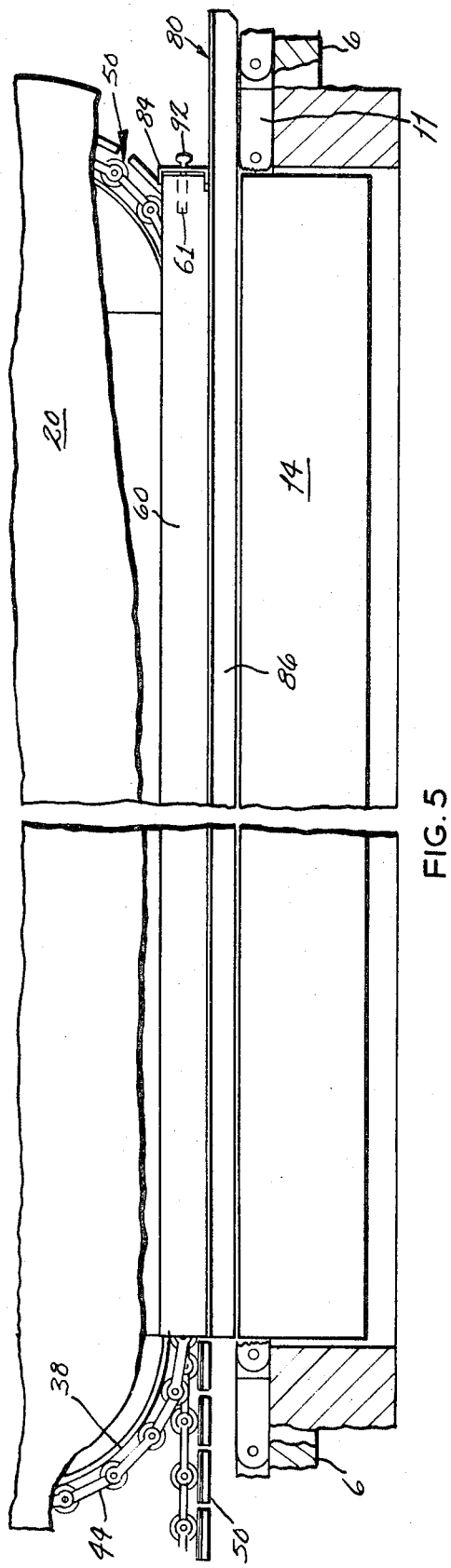
FIG. 5 is a fragmentary elevational view, partially broken away, showing the heater strip.

Referring now to the drawings, 2 designates an edge-banding machine including a pedestal-like base 4 which supports a table 6 having an upwardly opening groove 8 through which a pair of feed chains 10 pass. Feed chains 10 consist of a plurality of pin-connected links 11 and each link 11 has a substantially planar outwardly presented surface which is located slightly above the upper or work surface of table 6 when that particular link 11 is in groove 8 (FIG. 2). The upwardly presented surfaces of the portions of chains 10 passing through groove 8 will be almost flush with, yet raised slightly from, the work surface of table 6. At each end of table 6 chains 10 are trained over a pair of sprockets 12, one pair of which is connected by a drive train to a suitable drive motor (not shown) located within base 4. Projecting upwardly into groove 8 from table 6 and located between chains 10 is a lower heater bar 14 having a planar upper surface which lies flush with the upper surface of chains 10 when at elevated temperatures. Heater bar 14 is maintained at elevated temperatures preferably by means of an internal electrical heating element.

Connected to and extending outwardly from and laterally over the upper surface of table 6 are a pair of U-shaped support arms 18 which carry a pressure head 20 including a housing 21 located directly over and in upwardly spaced relation to groove 8. Internally, housing 21 is provided with a multiplicity of adjustable spring-loaded pressure shoes 22 (FIGS. 2 and 3) arranged in two rows located above chains 10. Each shoe 22 is pivotally connected to a supporting shank 24 which is reciprocally mounted in a stationary sleeve 26 within head 20. Operatively secured to shanks 24 above and below sleeves 26 are an upper plate 27 and a lower plate 29. Beyond sleeves 26 each shank 24 is provided with an adjusting nut 28 against which a coil spring 30 bears for urging the particular shoe 22 with which it is associated downwardly. The upper ends of springs 30 bear against a shiftable backing plate 31 mounted within head 20. On their lower faces, shoes 22 are provided with pairs of parallel longitudinally oriented rails 32, each having an inverted V-shaped configuration. The two pairs of aligned rails 32 on each set of shoes 22 align at the ends of pressure head 20 with guide plates 34, 36 (FIG. 2), having V-shaped arcuate margins 38 which align at their upper ends with V-shaped rails 40 located above springs 30 in the formation of two pairs of continuous V-shaped tracks 42. Each track 42 carries an intermediate chain 44 having rollers 46 provided with V-shaped peripheral grooves 48 which conform to the contour of and accommodate V-shaped rails 32, 40, and arcuate margins 38 of tracks 42. Chains 44 are free for movement about the periphery of tracks 42, but cannot be displaced laterally off such tracks. Trained around the outer peripheries of chains 44, excepting those portions of chains 44 at guide plates 34, are upper pressure chains 50, each of which is composed of a multiplicity of pin-connected links 52 having flat pressure plates 54, the outer surfaces of which are planar and pass over the planar upper surfaces of feed chains 10. The inwardly presented surfaces of pressure plates 54 are provided with pairs of longitudinally aligned V-shaped rails 56 which accommodate V-shaped grooves 48 of rollers 46, so that chains 44 are interposed between tracks 42 and pressure chains 50. Beyond guide plate 34, each chain 50 passes over and is engaged by a drive sprocket 58 which is driven through a suitable drive train by the drive motor in base 4. The angular velocities of sprockets 12, 58, are such that feed chains 10 and pressure chains 50 at all times have the same linear velocity.

Interposed between the lower portions of pressure chains 50 and the two rows of pressure shoes 22 is an upper heater bar 60 which is preferably heated by means of an electrical heating element. Heater bar 60 is operatively suspended from lower plate 29. The front end of upper heater bar 60 is located between pressure chains 50 as they pass over guide plates 36, while heater bar 60 is located directly above lower heater bar 14. The front end of bar 60 is exposed through housing 21 and is provided with an outwardly opening longitudinally extending threaded bore 61. Each pressure chain 50 passes above a corresponding feed chain 10 on each side of heater bars 14, 60. The planar surface of links 11 and of pressure plates 54 of links 52 are presented toward one another as feed and pressure chains 10, 50, move longitudinally with respect to table 6.

Immediately preceding pressure chain 50 at the infeed end of table 6, to the right of chain 50 in FIG. 2, pressure head 20 is fitted with a roller carrier 62 having pairs of front rollers 63 and rear rollers 64, both of which are toed-in slightly, the toe-in of front rollers 63 being slightly greater than that of rear rollers 64. One set of toed-in front and rear rollers 63, 64, precedes each set of pressure and feed chains 10, 50. Mounted on table 6 beneath roller carrier 62 are a pair of feed rollers 65, the outer peripheries of which project slightly beyond the work surface of table 6. Beyond roller carrier 62, table 6 is provided with an upstanding stock guide 70 which forms a continuation of the centerlines of heater bars 14, 60.

Pressure head 20 is provided with suitable means for raising and lowering backing plate 31 so as to vary the force exerted by springs 30 on pressure chain 50, the means including and being operated by handwheels 72. Suitable means are provided for changing the velocities of feed and pressure chains 10, 50, and for regulating the temperature of heater bars 14, 60.

Further details of this structure are found in U.S. Patents 2,269,816, 2,305,525, and 2,372,894.

Figure 6:
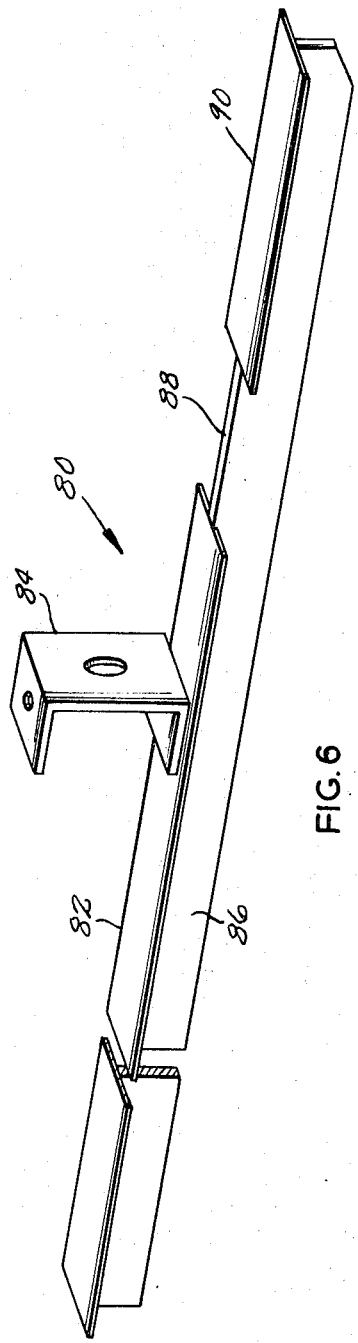
FIG. 6 is a fragmentary perspective view of the heater strip forming part of the present invention.

In lieu of the flat heater strip carried by a conventional veneer splicing machine along and against the bottom surface of its upper heater bar 60, edge-banding machine 2 is provided with a T-shaped heater strip 80 which is preferably fabricated from brass and subsequently chrome plated. Heater strip 80 (FIG. 6) includes a heat-receiving horizontal member 82 having a U-shaped bracket 84 attached to the upper surface thereof in close proximity to one of its ends. Welded, brazed or otherwise suitably affixed to the underside of horizontal member 82 is a depending or vertical abutment member 86 which projects beyond the bracket end of horizontal member 82 where it is provided with an upwardly extending boss 88, the upper surface of which is planar with the upper surface of horizontal member 82. Similarly secured to abutment member 86 beyond boss 88 is an end plate 90 having upper and lower surfaces which are coplanar with the corresponding surfaces on horizontal member 82. Heater strip 80 fits between pressure chains 50 with its horizontal member 82 against upper heater bar 60, in which position the upper leg of U-shaped bracket 84 fits over the upper surface of heater bar 60. Bracket 84 is secured against bar 60 by means of a retainer bolt 92 which threads into threaded bore 61, thereby securing heater strip 80 within pressure head 20. When strip 80 is so mounted, abutment member 86 will extend downwardly from horizontal member 82 intermediate pressure chains 50 and will align with and form a continuation of stock guide 70.

In operation, machine 2 accepts unbonded veneers 94 and panels 96 at its infeed end, draws the veneers and panels together through its interior in pairs against each side of heater strip 80, and discharges panels 96 with veneers 94 tightly and permanently adhered to their edges. A suitable adhesive is first applied to the surface of each panel 96 and the surface of each veneer 94 at which the bond is desired. Next, the adhesive-bearing surfaces of the veneer and panel are brought into facewise contact and the veneer is temporarily stapled or otherwise secured to the panel. After backing plate 31 is adjusted to a height suitable for acceptance of panels 96 by manipulating handwheel 72, a pair of panels 96 with veneers 94 temporarily attached thereto is passed longitudinally along table 6 against both sides of stock guide 70. At the end of stock guide 70, the leading edges of panels 96 pass beneath horizontal member 82 on heater strip 80, while veneers 94 bear against each side of abutment member 86. Thereafter the leading edges of panels 96 pass beneath one set of front and rear rollers 63, 64, and subsequently in between moving chains 10, 50, links 11, 52, of which engage the upper and lower surfaces of panels 96 and draw them through machine 2 at a controlled velocity. Any variations in wood thickness or incorrect adjustment of pressure head 20 will be absorbed by springs 30. Inasmuch as front and rear rollers 63, 64, toe inwardly or are canted inwardly with respect to the longitudinal axes of the chains, panels 96 will be urged toward abutment member 86. Accordingly, veneers 94 will be pressed tightly against the heated abutment member 86, thereby causing the adhesive to cure or set under pressure. This results in a tight and highly reliable bond between veneers 94 and the edges of panels 96. After panels 96 with veneers 94 securely attached thereto have been discharged from machine 2, the staples can be removed.

An edge-banding operation can be carried out on machine 2 at a speed of approximately 20 feet per minute under normal conditions, whereas the same operation performed by use of conventional clamping procedures requires in excess of 24 hours.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A machine for curing an adhesive substance interposed between the adjoining surfaces of a panel edge and a veneer strip covering said edge; said machine comprising a table having a work surface; an elongated heatable heater strip suspended above said work surface; said heater strip being T-shaped in cross-section and having in cross-section a first member forming an abutment surface presented in upstanding relation to said work surface and a horizontal member above said first member; a heatable lower heater bar mounted on said table below said heater strip; feed means for drawing said panel across said work surface with said edge presented toward said abutment surface and positioned between said horizontal member and said lower heater bar; and means for urging said edge toward said abutment surface as said feed means draws said panel across said work surface.

2. A machine according to claim 1 wherein said heater strip is positioned with respect to said work surface so that said horizontal member engages said panel when said panel is on said work surface and said edge engages said abutment surface.

3. A machine according to claim 1 wherein a heatable upper heater bar is in heat-conducting engagement with said heater strip so as to impart heat thereto.

4. A machine according to claim 3 wherein said heater strip is secured to said heater bar by means of a U-shaped bracket, said bracket having first and second legs engaging said horizontal member of said heater strip and said heater bar respectively; said bracket being made of a material which readily conducts heat.

5. A machine according to claim 1 wherein said means for urging said panel across said work surface include a feed chain on said work surface and a pressure chain mounted on a pressure head above said work surface; means being provided in said pressure head for urging said pressure chain toward said feed chain so as to cause said panel to be gripped therebetween.

6. A machine according to claim 5 wherein said means for urging said panel toward said abutment surface comprises at least one roller journaled to said pressure head and preceding said feed and pressure chains; said roller being toed in toward said abutment surface.

7. A machine according to claim 5 wherein second feed and pressure chains are provided in spaced relaiton to said first mentioned feed and pressure chains; said first member of said heater strip being positioned between said first and second feed and pressure chains.

8. A method for bonding a veneer strip to an edge of a panel comprising applying an adhesive substance to said edge of said panel; covering said edge with said veneer strip after said adhesive substance is applied to said edge; heating an elongated heater strip having in cross-section a horizontal heat-receiving member and a vertical abutment member extending downwardly therefrom to give said heater strip a T-shaped cross-sectional configuration; urging said edge of said panel toward said vertical abutment member so as to heat said veneer and said adhesive substance and simultaneously press said veneer against said edge, said heat-receiving member being adjacent said edge so as to impart additional heat thereto; and moving said panel along the length of said heater strip while said edge is being urged toward said abutment member.

9. A method according to claim 8 including heating a lower heater bar which is positioned below said heater strip, said lower heater bar being adjacent and below said edge when said edge is urged against said abutment member so as to impart additional heat thereto.

References Cited

UNITED STATES PATENTS

| 2,801,657 | 8/1957 | Chrisawn | 156—546 |
|---|---|---|---|
| 3,282,766 | 11/1966 | Wright | 156—544X |

FOREIGN PATENTS

| 548,312 | 10/1942 | Great Britain | 156—546 |

BENJAMIN A. BORCHELT, Primary Examiner

J. M. HANLEY, Assistant Examiner

U.S. Cl. X.R.

156—546